(12) United States Patent
Bouazizi et al.

(10) Patent No.: US 12,641,134 B2
(45) Date of Patent: May 26, 2026

(54) NETWORK RENDERING AND TRANSCODING OF AUGMENTED REALITY DATA

(71) Applicant: QUALCOMM Incorporated, San Diego, CA (US)

(72) Inventors: Imed Bouazizi, Frisco, TX (US); Nikolai Konrad Leung, San Francisco, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 18/438,992

(22) Filed: Feb. 12, 2024

(65) Prior Publication Data

US 2024/0275826 A1     Aug. 15, 2024

Related U.S. Application Data

(60) Provisional application No. 63/484,564, filed on Feb. 13, 2023, provisional application No. 63/596,869, filed on Nov. 7, 2023.

(51) Int. Cl.
*G06F 13/00* (2006.01)
*H04L 65/1016* (2022.01)
(Continued)

(52) U.S. Cl.
CPC ...... *H04L 65/1069* (2013.01); *H04L 65/1016* (2013.01); *H04N 19/40* (2014.11); *H04W 76/10* (2018.02)

(58) Field of Classification Search
CPC . H04L 65/1069; H04L 65/1016; H04N 19/40; H04W 76/10
(Continued)

(56) References Cited

U.S. PATENT DOCUMENTS

2019/0155465 A1    5/2019   Maxwell
2021/0272375 A1    9/2021   Lashmar et al.
(Continued)

FOREIGN PATENT DOCUMENTS

WO          2021104181 A1      6/2021
WO          2022206624 A1     10/2022
WO       WO-2024033360 A1 *    2/2024    ......... H04L 65/1016

OTHER PUBLICATIONS

3GPP: "3rd Generation Partnership Project, Technical Specification Group Services and System Aspects, IP Multimedia Subsystem (IMS), Stage 2 (Release 16)", 3GPP TS 23.228, V16.6.0, Dec. 2020, pp. 1-349.

(Continued)

*Primary Examiner* — Kenneth R Coulter
(74) *Attorney, Agent, or Firm* — Shumaker & Sieffert, P.A.

(57) ABSTRACT

An example first user equipment (UE) for communicating media data includes: a memory configured to store media data; and a processing system comprising one or more processors implemented in circuitry, the processing system being configured to: send a request to start an augmented reality (AR) media call with a second UE to a call session control function (CSCF), the request including data indicating a request for transcoding of AR media data to two-dimensional video data; establish a media communication session with a transcoding device executing a media function or a multimedia resource function, the transcoding device being between the first UE and the second UE; receive transcoded media data from the transcoding device that the transcoding device transcoded from AR media data received from the second UE; and present the transcoded media data.

24 Claims, 11 Drawing Sheets

(51) Int. Cl.
     *H04L 65/1069*      (2022.01)
     *H04N 19/40*        (2014.01)
     *H04W 76/10*        (2018.01)
(58) Field of Classification Search
     USPC ........................................ 709/227, 226, 246
     See application file for complete search history.

(56)                    References Cited

U.S. PATENT DOCUMENTS

2023/0252735 A1    8/2023   Sodagar
2025/0190220 A1*   6/2025   Wang .................... G06F 9/3888

OTHER PUBLICATIONS

3GPP: "3rd Generation Partnership Project, Technical Specification Group Services and System Aspects, Split Rendering Media Service Enabler, (Release 18)", 3GPP TS 26.565 V1.0.0, Dec. 2023, pp. 1-37.

3GPP: "3rd Generation Partnership Project, Technical Specification Group Services and System Aspects, Study on evolution of IMS multimedia telephony service (Release 18)", 3GPP TR 22.873, V1.0.0, Jun. 2021, pp. 1-18.

3GPP: "Meeting Report for S2 Meeting: #S2-154AHE Electronic Meeting", Third Generation Partnership Project, Version: v1.0.0, S2 Meeting #S2-154AHE Jan. 16-20, 2023, Electronic, 1146 Pages.

3GPP TR 26.998: "3rd Generation Partnership Project, Technical Specification Group SA, Support of 5G Glass-Type Augmented Reality/Mixed Reality (AR/MR) Devices, (Release 17)", 3GPP TR 26.998, V17.0.0, 3rd Generation Partnership Project, Mobile Competence Centre, 650, Route Des Lucioles, F-06921 Sophia-Antipolis Cedex, France, No. V17.0.0, Mar. 31, 2022, 119 Pages.

3GPP TS 26.114: "3rd Generation Partnership Project, Technical Specification Group Services and System Aspects, IP Multimedia Subsystem (IMS), Multimedia Telephony, Media Handling and Interaction (Release 17)", 3GPP TS 26.114, V17.5.0, Jun. 2022, pp. 1-480.

ETSI: "5G, Extended Reality (XR) in 5G (3GPP TR 26.928 version 16.1.0 Release 16)", ETSI TR 126 928, V16.1.0, Jan. 2021, pp. 1-132.

Huawei: "Split Rendering Solution for IBACS ", 3GPP TSG SA WG4#121, Tdoc S4-221340, Type Discussion, 3rd Generation Partnership Project (3GPP), Mobile Competence Centre, 650, Route Des Lucioles, F-06921 Sophia-Antipolis Cedex, France, vol. 3GPP SA4, No. Toulouse, FR, Nov. 14, 2022-Nov. 18, 2022, Nov. 8, 2022, 6 Pages.

International Search Report and Written Opinion—PCT/US2024/015520—ISA/EPO—May 24, 2024.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

KPN N.V. (Rapporteur): "[IBACS] Permanent Document v0.1.0", 3GPP TSG SA WG4 Meeting #121, S4-221554, Type Other, 3rd Generation Partnership Project (3GPP), Mobile Competence Centre, 650, Route Des Lucioles, F-06921 Sophia-Antipolis Cedex, France, vol. 3GPP SA 4, No. Toulouse, FR, Nov. 14, 2022-Nov. 18, 2022, Nov. 17, 2022, pp. 1-17.

KPN N.V. (Rapporteur): "IBACS Permanent Document v0.5.0", 3GPP TSG SA WG4 Meeting #125, S4-231489, Type Other, 3rd Generation Partnership Project (3GPP), Mobile Competence Centre, 650, Route Des Lucioles, F-06921 Sophia-Antipolis Cedex, France, vol. 3GPP SA 4, No. Goteborg, SE, Aug. 21, 2023-Aug. 25, 2023, Aug. 25, 2023, 35 Pages.

KPN N.V. (Rapporteur):"IBACS Permanent Document V0.6.0", 3GPP TSG SA WG4 Meeting #126, S4-231966, Type Other, 3rd Generation Partnership Project (3GPP), Mobile Competence Centre, 650, Route Des Lucioles, F-06921 Sophia-Antipolis Cedex, France, vol. 3GPP SA 4, No. Chicago, US, Nov. 13, 2023-Nov. 17, 2023, Nov. 17, 2023, 45 Pages.

Nokia Corporation., et al., "[IBACS] Basic AR Call Flow", 3GPP TSG SA WG4 Meeting #121, S4-221550, Type Discussion, 3rd Generation Partnership Project (3GPP), Mobile Competence Centre, 650, Route Des Lucioles, F-06921 Sophia-Antipolis Cedex, France, vol. 3GPP SA 4, No. Toulouse, FR, Nov. 14, 2022-Nov. 18, 2022, Nov. 17, 2022, 3 Pages.

Qualcomm Inc: "['IBACS] Transcoding for Network Rendering", TSG SA4 SWG #126 Meeting, TDOC S4-231728, Type Discussion, 3rd Generation Partnership Project (3GPP), Mobile Competence Centre, 650, Route Des Lucioles, F-06921 Sophia-Antipolis Cedex, France, vol. 3GPP SA 4, No. Chicago, US, Nov. 13, 2023-Nov. 17, 2023, Nov. 7, 2023, 6 Pages.

Schulzrinne H., et al., "RTP: A Transport Protocol for Real-Time Applications", Network Working Group, Request for Comments 3550, The Internet Society, No. 1889, Jul. 2003, XP003022794, , pp. 1-89.

VR Industry Forum: "Volumetric Video Guidelines", Public Draft, Version 0.95, Dec. 1, 2021, pp. 1-42.

* cited by examiner

DETERMINE THAT UE IS NOT ABLE TO RENDER AR DATA — 450

FORM REQUEST FOR NETWORK TRANSCODING OF AR MEDIA DATA — 452

SEND REQUEST TO CSCF — 454

ESTABLISH SESSION WITH TRANSCODING DEVICE — 456

RECEIVE TRANSCODED MEDIA DATA FROM TRANSCODING DEVICE — 458

PRESENT TRANSCODED MEDIA DATA — 460

GENERATE AR-RELATED DATA — 462

SEND AR-RELATED DATA — 464

NETWORK RENDERING AND TRANSCODING OF AUGMENTED REALITY DATA

This application claims the benefit of U.S. Provisional Application No. 63/484,564, filed Feb. 13, 2023, and of U.S. Provisional Application No. 63/596,869, filed Nov. 7, 2023, the entire contents of each of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for communicating augmented reality (AR) data between two or more user equipment (UE) devices. In particular, a UE may not be capable of rendering three-dimensional (3D) visual content, such as 3D virtual object data, to two-dimensional (2D) visual content (e.g., image or video data). Thus, in order to participate in an AR communication session, per the techniques of this disclosure, a separate device, such as an application server (AS) in a 5G network, may be configured to render the 3D visual content to 2D visual content. The UE may then present the 2D visual content.

In one example, a method of communicating media data includes: sending, by a first user equipment (UE), a request to start an augmented reality (AR) media call with a second UE to a call session control function (CSCF), the request including data indicating a request for transcoding of AR media data to two-dimensional video data; establishing, by the first UE, a media communication session with a transcoding device executing a media function or a multimedia resource function, the transcoding device being between the first UE and the second UE; receiving, by the first UE, transcoded media data from the transcoding device that the transcoding device transcoded from AR media data received from the second UE; and presenting, by the first UE, the transcoded media data.

In another example, a first user equipment (UE) for communicating media data includes a memory configured to store media data; and a processing system comprising one or more processors implemented in circuitry, the processing system being configured to: send a request to start an augmented reality (AR) media call with a second UE to a call session control function (CSCF), the request including data indicating a request for transcoding of AR media data to two-dimensional video data; establish a media communication session with a transcoding device executing a media function or a multimedia resource function, the transcoding device being between the first UE and the second UE; receive transcoded media data from the transcoding device that the transcoding device transcoded from AR media data received from the second UE; and present the transcoded media data.

In another example, a method of communicating media data includes: receiving, by a transcoding device executing a media function or a multimedia resource function, a request from a first user equipment (UE) for transcoding of augmented reality (AR) media data of an AR call with a second UE; in response to receiving, by the transcoding device, AR media data from the second UE, rendering, by the transcoding device, the AR media data to form rendered 2D media data; and sending, by the transcoding device, the rendered 2D media data to the first UE.

In another example, a transcoding device executing a media function or a multimedia resource function includes a memory configured to store media data; and a processing system comprising one or more processors implemented in circuitry, the processing system being configured to: receive a request from a first user equipment (UE) for transcoding of augmented reality (AR) media data of an AR call with a second UE; in response to receiving AR media data from the second UE, render the AR media data to form rendered 2D media data; and send the rendered 2D media data to the first UE.

The details of one or more examples are set forth in the accompanying drawings and the description below. Other features, objects, and advantages will be apparent from the description and drawings, and from the claims.

DETAILED DESCRIPTION

Augmented reality (AR) calls (or other extended reality (XR) media communication sessions, such as mixed reality (MR) or virtual reality (VR)) may require significant processing resources to render content of the AR call scene, especially when multiple participants contribute to the creation of a complex AR call scene. These scenes may include a virtual environment that may be anchored to a real world location, as well as content from all participants in the call. Content from a participant may include, for example, user avatars, slide materials, 3D virtual objects, etc.

Physically based rendering (PBR) may be included in rendering AR or other XR data. PBR generally includes rendering image data through emulating light transmission in a virtual world to recreate real world lighting, including user shadows and object reflections on specular surfaces. Advanced rendering capabilities such as PBR may not be available to certain devices, such as AR glasses and head mounted displays (HMDs), or may require too much power to run on such devices.

The techniques of this disclosure include using signaling to invoke split rendering (also referred to herein as "network rendering") for an AR call over IP Multimedia Subsystem (IMS). Using such signaling, a client device (e.g., a user equipment (UE)) may signal to another device that the client device is requesting split rendering, where the other device will render image data from AR data of an AR media communication session, and the client device will present the rendered image data. The client device may be, for example, an HMD, AR glasses, or the like. The other device may be an AR application server (AS). In this manner, such devices may be capable of participating in an AR communication session, even when such devices are not capable of rendering AR data. Additionally, upstream devices that are capable of rendering AR data may receive a request to render the AR device on behalf of another device, such as a UE, HMD, or AR glasses, and render the AR data on behalf of the other device, thereby achieving split rendering.

This disclosure describes techniques that may be used to handle network rendering (e.g., split rendering) of AR call session data, e.g., as a transcoding operation. Network rendering may be triggered by an IMS application server (AS) for client devices that are not configured with requisite AR processing capabilities. A media function (MF) or multimedia resource function (MRF) may act on behalf of the endpoint (e.g., UE-A) to produce corresponding AR content, e.g., to place a 2D overlay video of a participant on a 3D screen in a virtual 3D scene.

Figure 1:
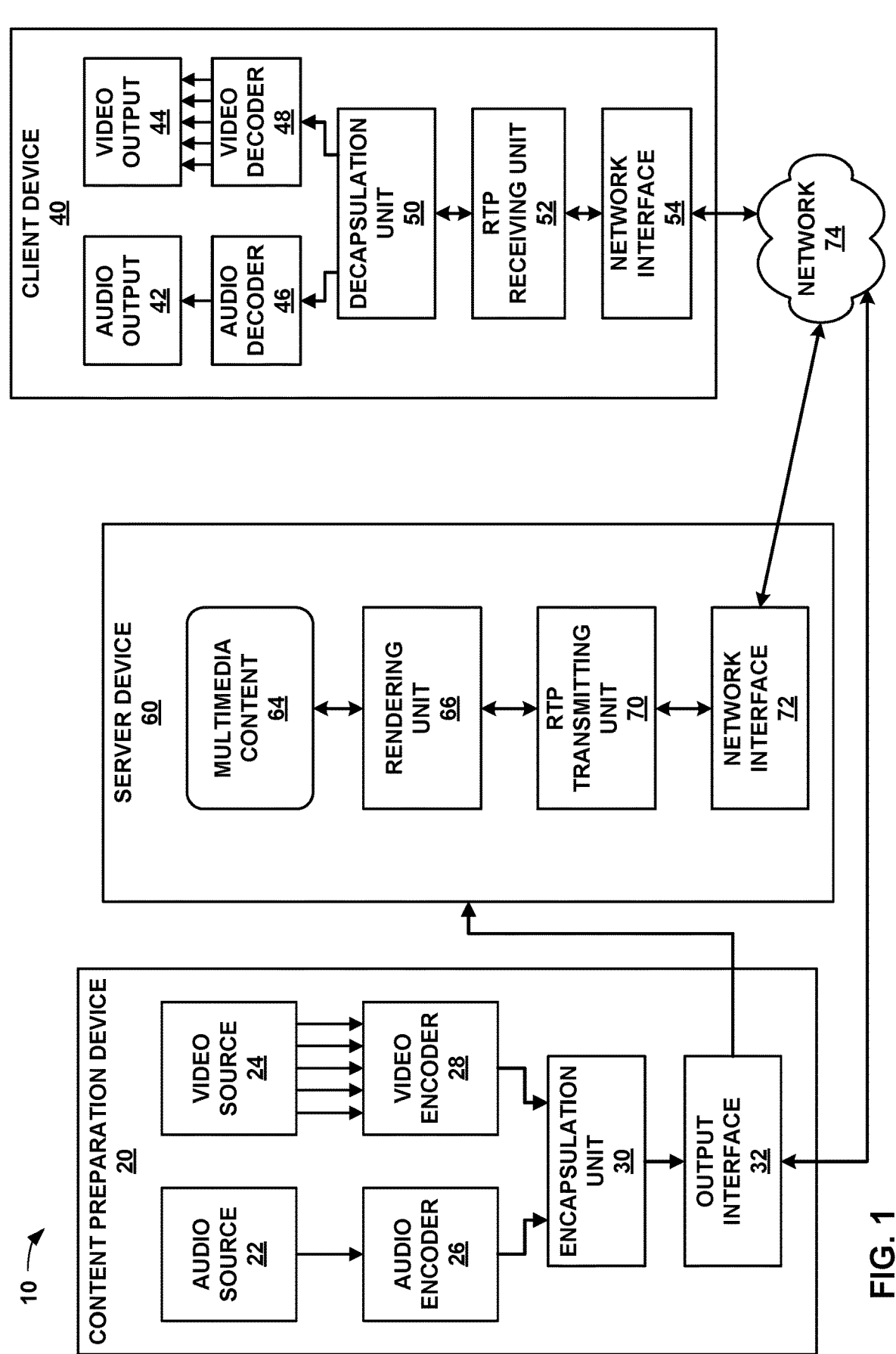
FIG. 1 is a block diagram illustrating an example system that implements techniques for streaming media data over a network.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a media presentation. For example, the coded video or audio part of the media presentation can be an elementary stream. An elementary stream may be converted into a packetized elementary stream (PES) before being encapsulated within a video file. Within the same media presentation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into streamable media data.

Encapsulation unit 30 receives PES packets for elementary streams of a media presentation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

Server device 60 includes Real-time Transport Protocol (RTP) transmitting unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64 and include components that conform substantially to those of server device 60. In general, network interface 72 is configured to send and receive data via network 74.

In the example of FIG. 1, according to the techniques of this disclosure, server device 60 includes rendering unit 66. Rendering unit 66 may be configured to receive extended reality (XR) media data, including for example augmented reality (AR) media data, mixed reality (MR) media data, or virtual reality (VR) media data, and to render image data using the XR media data and multimedia content 64 on behalf of client device 40. For example, client device 40 and other client devices participating in an AR call may provide XR media data, such as pose information, avatars, documents (e.g., slides for a slide deck for a presentation), 3D virtual objects, or the like to server device 60. Multimedia content 64 may correspond to other virtual object data or pre-rendered image data. Ultimately, rendering unit 66 may combine various XR media data from multiple client devices and render image or video data using the XR media data for client device 40.

Although shown as forming part of server device 60, in other examples, rendering unit 66 may be included in content preparation device 20, e.g., as a portion of video source 24. For example, video source 24 may include scene data for a virtual scene, such as a background, virtual objects (e.g., tables, chairs, walls, screens for presentations, etc.), and virtual light sources, as well as avatars from other users (e.g., a user of client device 40), user virtual objects, pose information for the users, or the like. Ultimately a rendering unit of content preparation device 20 may render 2D images from these virtual objects and provide the 2D images to video encoder 28 to be encoded. In this manner, content preparation device 20 may render images for presentation by client device 40 using split rendering.

RTP transmitting unit 70 is configured to deliver media data, including the rendered XR/AR/MR/VR media content, to client device 40 via network 74 according to RTP, which is standardized in Request for Comment (RFC) 3550 by the Internet Engineering Task Force (IETF). RTP transmitting unit 70 may also implement protocols related to RTP, such as RTP Control Protocol (RTCP), Real-time Streaming Protocol (RTSP), Session Initiation Protocol (SIP), and/or Session Description Protocol (SDP). RTP transmitting unit 70 may send media data via network interface 72, which may implement Uniform Datagram Protocol (UDP) and/or Internet protocol (IP). Thus, in some examples, server device 60 may send media data via RTP and RTSP over UDP using network 74.

RTP transmitting unit 70 may receive an RTSP describe request from, e.g., client device 40. The RTSP describe request may include data indicating what types of data are supported by client device 40. RTP transmitting unit 70 may respond to client device 40 with data indicating media streams, such as media content 64, that can be sent to client device 40, along with a corresponding network location identifier, such as a uniform resource locator (URL) or uniform resource name (URN).

RTP transmitting unit 70 may then receive an RTSP setup request from client device 40. The RTSP setup request may generally indicate how a media stream is to be transported. The RTSP setup request may contain the network location identifier for the requested media data (e.g., media content 64) and a transport specifier, such as local ports for receiving RTP data and control data (e.g., RTCP data) on client device 40. RTP transmitting unit 70 may reply to the RTSP setup request with a confirmation and data representing ports of server device 60 by which the RTP data and control data will be sent. RTP transmitting unit 70 may then receive an RTSP play request, to cause the media stream to be "played," i.e., sent to client device 40 via network 74. RTP transmitting unit 70 may also receive an RTSP teardown request to end the streaming session, in response to which, RTP transmitting unit 70 may stop sending media data to client device 40 for the corresponding session.

RTP receiving unit 52, likewise, may initiate a media stream by initially sending an RTSP describe request to server device 60. The RTSP describe request may indicate types of data supported by client device 40. RTP receiving unit 52 may then receive a reply from server device 60 specifying available media streams, such as media content 64, that can be sent to client device 40, along with a corresponding network location identifier, such as a uniform resource locator (URL) or uniform resource name (URN).

RTP receiving unit 52 may then generate an RTSP setup request and send the RTSP setup request to server device 60. As noted above, the RTSP setup request may contain the network location identifier for the requested media data (e.g., media content 64) and a transport specifier, such as local ports for receiving RTP data and control data (e.g., RTCP data) on client device 40. In response, RTP receiving unit 52 may receive a confirmation from server device 60, including ports of server device 60 that server device 60 will use to send media data and control data.

After establishing a media streaming session between server device 60 and client device 40, RTP transmitting unit 70 of server device 60 may send media data (e.g., packets of media data) to client device 40 according to the media streaming session. Server device 60 and client device 40 may exchange control data (e.g., RTCP data) indicating, for example, reception statistics by client device 40, such that server device 60 can perform congestion control or otherwise diagnose and address transmission faults.

Network interface 54 may receive and provide media of a selected media presentation to RTP receiving unit 52, which may in turn provide the media data to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, RTP receiving unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, RTP receiving unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via RTP receiving unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
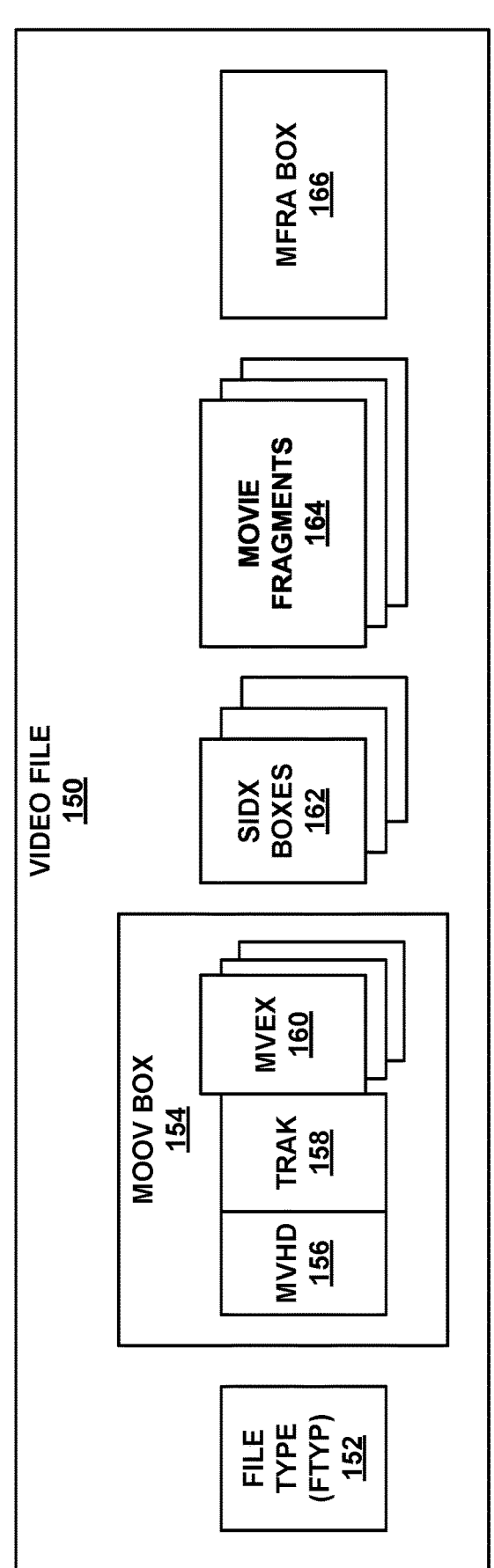
FIG. 2 is a block diagram illustrating elements of an example video file.

FIG. 2 is a block diagram illustrating elements of an example video file 150. As described above, video files in accordance with the ISO base media file format and extensions thereof store data in a series of objects, referred to as "boxes." In the example of FIG. 2, video file 150 includes file type (FTYP) box 152, movie (MOOV) box 154, segment index (sidx) boxes 162, movie fragment (MOOF) boxes 164, and movie fragment random access (MFRA) box 166. Although FIG. 2 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

MOOV box 154, in the example of FIG. 2, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 2). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 3:
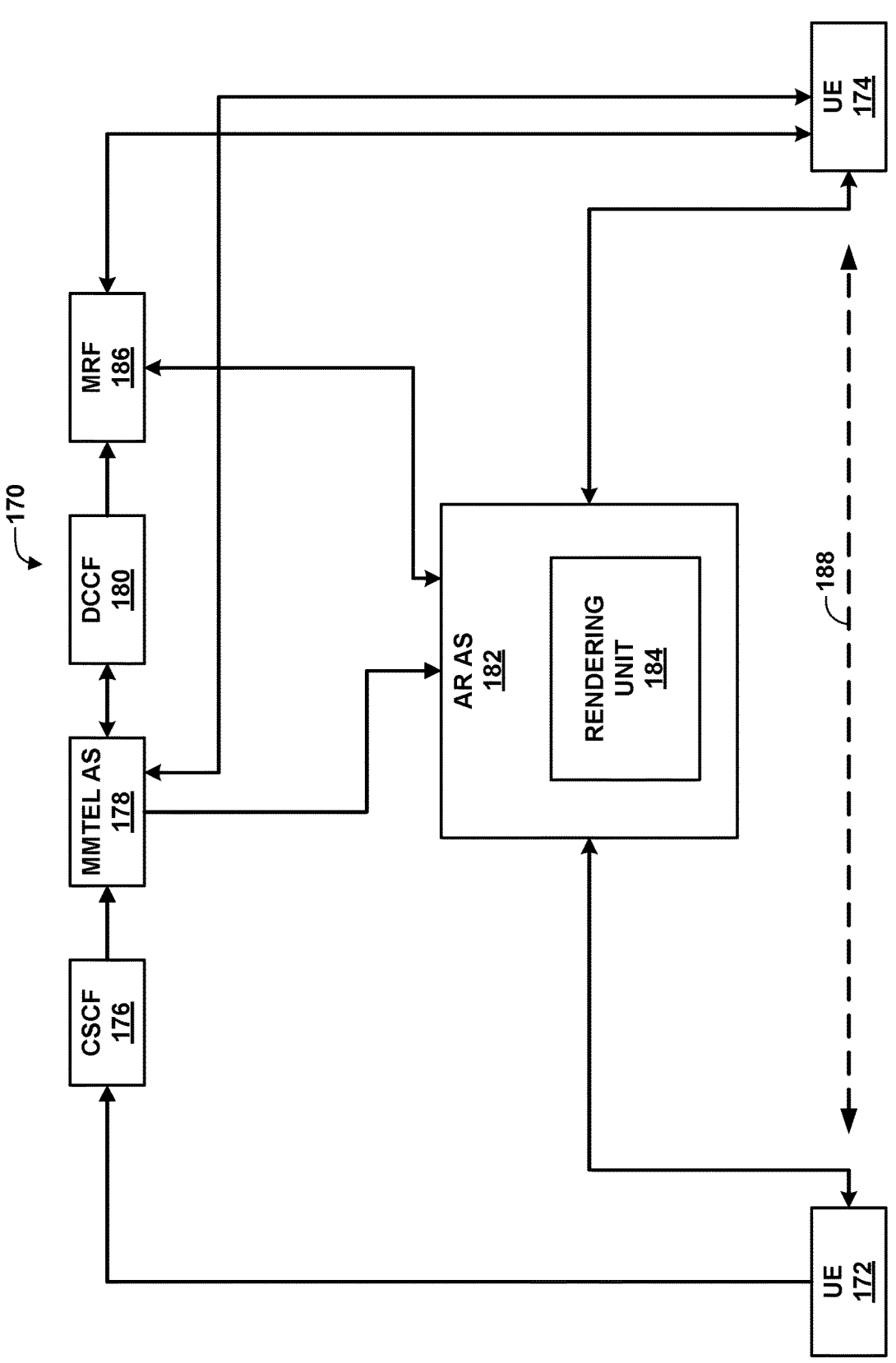
FIG. 3 is a block diagram illustrating an example network including various devices for performing the techniques of this disclosure.

FIG. 3 is a block diagram illustrating an example network 170 including various devices for performing the techniques of this disclosure. In this example, network 170 includes user equipment (UE) devices 172, 174, call session control function (CSCF) 176, multimedia telephony application server (MMTel AS) 178, data channel control function (DCCF) 180, multimedia resource function (MRF) 186, and augmented reality application server (AR AS) 182.

UEs 172, 174 represent examples of UEs that may participate in an AR communication session 188. That is, UEs 172, 174 may exchange AR media data related to a virtual scene, represented by a scene description. Users of UEs 172, 174 may view the virtual scene including virtual objects, as well as user AR data, such as avatars, shadows cast by the avatars, user virtual objects, user provided documents such as slides, images, videos, or the like, or other such data. Ultimately, users of UEs 172, 174 may experience an AR call from the perspective of their corresponding avatars (in first or third person) of virtual objects and avatars in the scene.

UEs 172, 174 may collect pose data for users of UEs 172, 174, respectively. For example, UEs 172, 174 may collect pose data including a position of the users, corresponding to positions within the virtual scene, as well as an orientation of a viewport, such as a direction in which the users are looking (i.e., an orientation of UEs 172, 174 in the real world, corresponding to virtual camera orientations). UEs 172, 174 may provide this pose data to AR AS 182 and/or to each other.

Each of UEs 172, 174 may generally perform the various functionality attributed to content preparation device 20, server device 60, and client device 40 of FIG. 1. However, according to the techniques of this disclosure, one of UEs 172, 174, e.g., UE 172, is not capable of performing 3D virtual object rendering and would not include a rendering unit for rendering 3D virtual objects into 2D images or video data. Thus, UE 172 would not perform the functionality of rendering unit 66 of FIG. 1. Instead, rendering unit 184 of AR AS 182 may perform the functionality of rendering unit 66 of FIG. 1 on behalf of UE 172, as discussed in greater detail below.

CSCF 176 may be a proxy CSCF (P-CSCF), an interrogating CSCF (I-CSCF), or serving CSCF (S-CSCF). CSCF 176 may generally authenticate users of UEs 172 and/or 174, inspect signaling for proper use, provide quality of service (QoS), provide policy enforcement, participate in session initiation protocol (SIP) communications, provide session control, direct messages to appropriate application server(s), provide routing services, or the like. CSCF 176 may represent one or more I/S/P CSCFs.

MMTel AS 178 represents an application server for providing voice, video, and other telephony services over a network, such as a 5G network. MMTel AS 178 may provide telephony applications and multimedia functions to UEs 172, 174.

DCCF 180 may act as an interface between MMTel AS 178 and MRF 186, to request data channel resources from MRF 186 and to confirm that data channel resources have been allocated. MRF 186 may be an enhanced MRF (eMRF) in some examples. In general, MRF 186 generates scene descriptions for each participant in an AR communication session.

AR AS 182 may participate in AR communication session 188 according to the techniques of this disclosure. In particular, AR AS 182 includes rendering unit 184. For purposes of example, it may be assumed that UE 172 is not capable of rendering virtual object data to form two-dimensional (2D) image or video data, even if UE 172 is capable of displaying/presenting such data. Thus, according to the techniques of this disclosure, rendering unit 184 of AR AS 182 may render the virtual object data, such as scene data, avatar data, pose information for the avatars as well as for a viewport of UE 172 (i.e., a direction in which the user of UE 172 is facing and/or is rotated), or the like. In this manner, UE 172 and AR AS 182 may perform split rendering. AR AS 182 may be an Edge AS that meets the requirements of an AR call.

According to the techniques of this disclosure, AR communication session data may be transcoded into 2D overlay video data. A data channel for AR communication session 188 may distribute a scene description for AR communications session 188. The scene description may be used to compose the scene that will serve as a shared space for all participants (e.g., users of UEs 172, 174) in AR communication session 188 (which may also be referred to as an "AR call"). Each participant may declare support for the AR call, as well as rendering capabilities of respective UEs 172, 174 in an invitation to the AR call. UEs 172, 174 may receive respective scene descriptions that are tailored to rendering capabilities of UEs 172, 174. The scene descriptions may offer alternative representations that UEs 172, 174 may choose.

Figure 4:
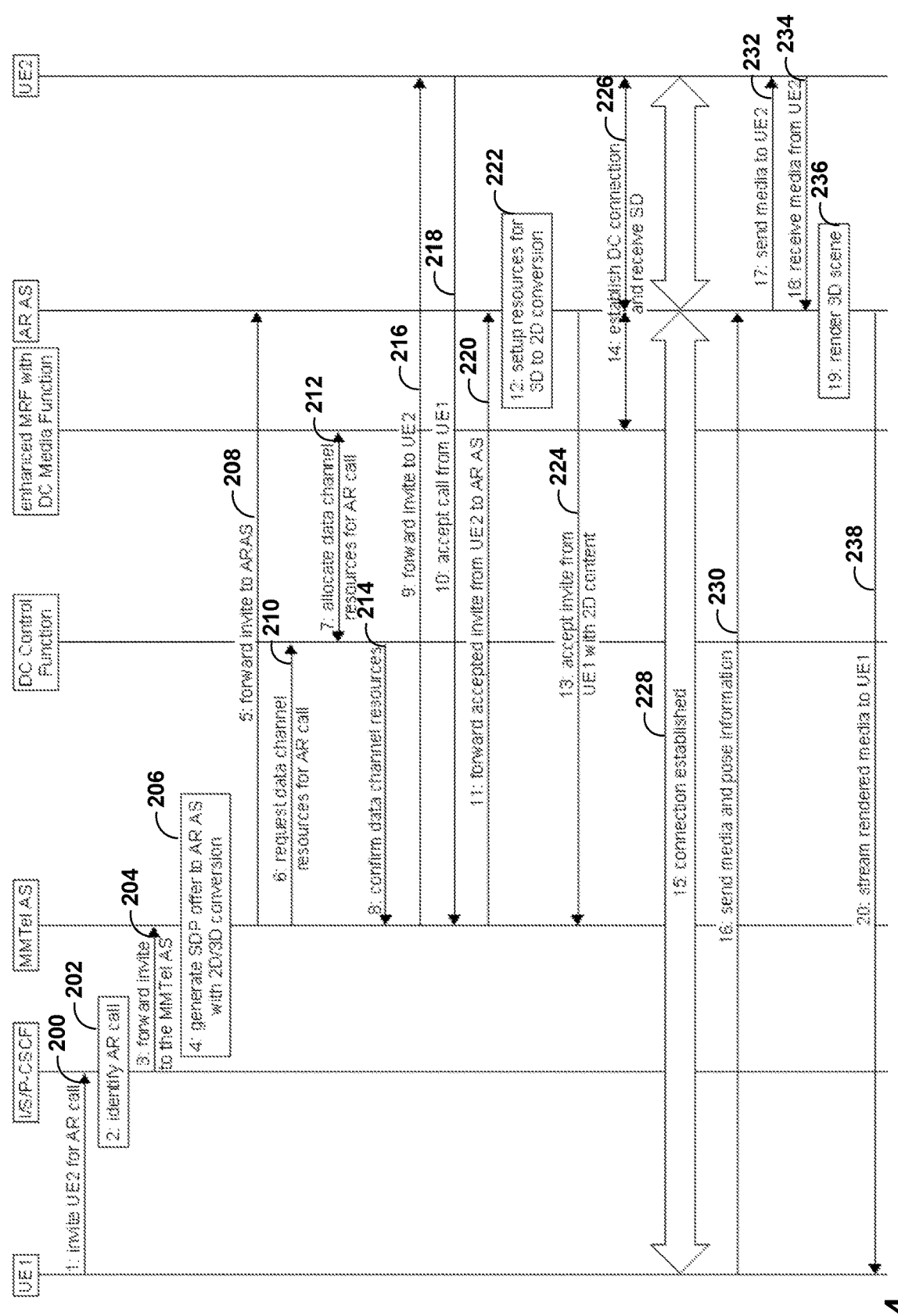
FIG. 4 is a flow diagram illustrating an example procedure for establishing an AR call according to the techniques of this disclosure.

FIG. 4 is a flow diagram illustrating an example procedure for establishing an AR call according to the techniques of this disclosure. The various steps of FIG. 4 are described with respect to the components of FIG. 3.

Initially, UE 172 ("UE1" in FIG. 4) may request to start an AR call with UE 174 ("UE2" in FIG. 4) or join an ongoing AR call/conference (200). Thus, UE 172 may generate a session description protocol (SDP) offer that indicates that UE 172 can only receive 2D content. The offer may indicate that UE 172 can send pose information and other 2D/3D media. UE 174 sends the invite to the I/S/P-CSCF, i.e., CSCF 176 of FIG. 3.

CSCF 176 identifies the AR call in the offer (202). CSCF 176 then forwards the invite to MMTel AS 178 (204).

MMTel AS 178 identifies the capabilities of UE 172 and determines to invoke split rendering functionality for the call. MMTel AS 178 rewrites the SDP offer to receive and potentially also offer 3D content (206). MMTel AS 178 then forwards the invite to AR AS 182 (208). The invite may be a regular session initiation protocol (SIP) invite, or MMTel AS 178 may use a service based architecture (SBA) interface (e.g., a RESTful interface). MMTel AS 178 also sends a request to DCCF 180 to serve data channel resources to an AR call application (210).

DCCF 180, in response, sends a request to MRF 186 to allocate necessary data channel resources for the AR call (212). DCCF 180 may indicate the type of application, to enable MRF 186 to generate the proper scene description for the AR call. In response, MRF 186 responds to DCCF 180 to indicate when the resources have been allocated. DCCF 180 confirms the allocation of the data channel resources to MMTel AS 178 (214).

In addition, MMTel AS 178 forwards the invite that was generated in step 4 to UE 174 (216).

In response, UE 174 informs MMTel AS 178 that UE 174 has accepted the call (218).

After receiving the answer from UE 174, MMTel AS 178 passes the answer to AR AS 182 (220).

AR AS 182 sets up resources for the AR call and for conversion from 3D scene objects to 2D images and/or video data (222). AR AS 182 may then accept the invite from UE 172 (224). This establishes an AR communication session between AR AS 182 and UE 172, which includes pre-rendered AR call content on a downlink channel.

Both AR AS 182 and UE 174 establish connections to MRF 186 to receive the scene descriptions for the call (226).

Ultimately, connections between UE 172 and AR AS 182 and between AR AS 182 and UE 174 are established (228).

UE 172 may send its media stream data and pose information to AR AS 182 (230).

AR AS 182 may forward media data and pose information received from UE 172 to UE 174, or AR AS 182 may generate 3D media and send the generated 3D media to UE 174 (232).

AR AS 182 may receive media generated by UE 174 (234). AR AS 182 may use rendering unit 184 to render the scene as described by the scene description, together with the received media from UE 172 and UE 174 (236). Ultimately, AR AS 182 may stream the rendered media to UE 172 for display (238). Thus, UE 172 may display the rendered media.

This procedure allows network elements to transparently invoke split rendering (e.g., by AR AS 182) for the AR call, without explicit intervention of UE 172. MMTel AS 178 may be responsible for selecting the appropriate split rendering server that is performed by AR AS 182.

In some examples, UE 172 may instead receive an invite to join an AR call. In some examples, UE 172 may instead join an AR conference with multiple participants instead of just two UEs.

Appropriate signaling may be used to identify an AR call and convey the rendering capabilities of, e.g., UE 172 to AR AS 182. UE 172 may indicate, during a registration process or call setup with the CSCF 176, whether UE 172 supports AR calls. UE 172 may also indicate its own rendering capabilities. These capabilities may include display configuration (e.g., access to an HMD), OpenXR support (supported view configuration and projection layers), and/or GPU capabilities, such as support for different rendering pipelines as well as supported scene complexity.

A new session description protocol (SDP) level attribute may be used to indicate these capabilities for the session setup phase. An example Augmented Backus-Naur Form (ABNF) syntax for such an SDP level attribute is shown below:

```
display-attr="a=display-capabilities:" view-config
    SP*(projection-param/render-param)

view-config="view=" "2D"/"Stereo"/"Stereo+Depth"

projection-param="projection="1*(("Quad"/
    "Equirectangular"/"Depth")*1(";"))
```

MMTel AS 178 may detect this attribute and determine to invoke split rendering capabilities for the AR call, in response. The absence of the attribute may indicate that the device has no AR capabilities. If UE 174 is offering 3D content, MMTel AS 178 may also invoke split rendering capabilities to convert from 3D to 2D for UE 172.

Figure 5:
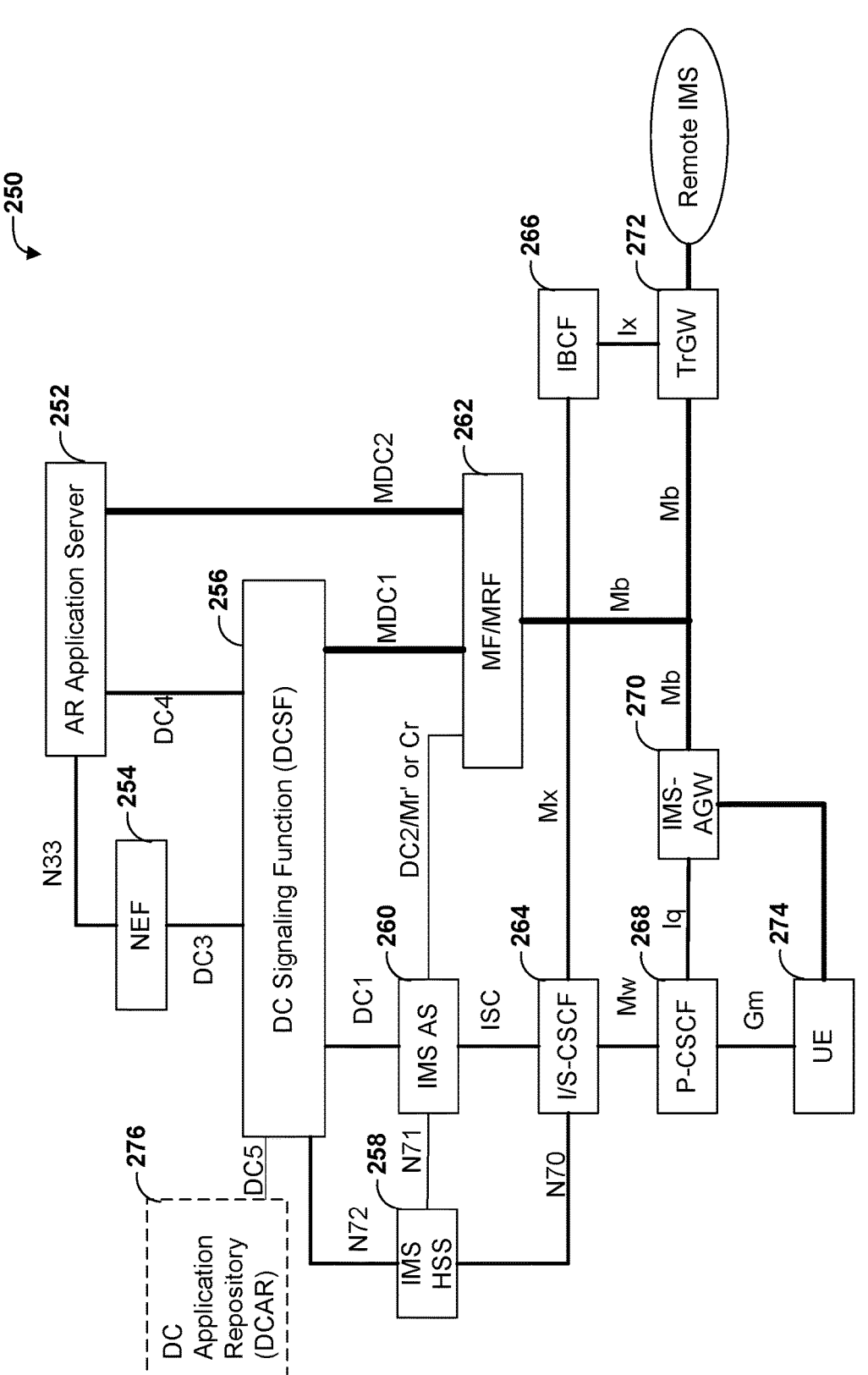
FIG. 5 is a conceptual diagram illustrating an example IP Multimedia Subsystem (IMS) architecture.

FIG. 5 is a conceptual diagram illustrating an example IP Multimedia Subsystem (IMS) architecture 250. In this example, IMS architecture 250 includes augmented reality (AR) application server (AS) 252, network exposure function (NEF) 254, data channel (DC) signaling function (DCSF) 256, IP multimedia subsystem (IMS) home subscriber system (HSS) 258, IMS AS 260, media function/multimedia resource function (MF/MRF) 262, I/S-call session control function (CSCF) 264, interconnection border control function (IBCF) 266, P-CSCF 268, IMS access gateway (AGW) 270, transition gateway (TrGW) 272, user equipment 274, and DC application repository (DCAR) 276. The IMS architecture may support data channel services in IMS. AR calls may be enabled through the exchange of a scene description and scene description updates over the data channels. AR calls may be supported by a Multimedia Resource Function (MRF) or a Media Function. MF/MRF 262 may use a service-based interface to interact with a data channel application server (AS).

As discussed in greater detail below, UE 274 may establish an AR media session/AR call with a second UE (not shown), where the second UE may be coupled to a remote IMS as shown in FIG. 5. UE 274 may either be incapable of rendering AR data or may elect not to render AR data and instead request that the AR data be network rendered, e.g., by MR/MRF 262. Accordingly, UE 274 may send a request to MF/MRF 262 via I/S-CSCF 264 for network rendering of AR data. In response, MF/MRF 262 may receive AR media data from the second UE, then transcode the AR media data to 2D video data and send the transcoded 2D video data (transcoded media data) to UE 274. UE 274 may then receive the transcoded media data from MF/MRF 262 and present the transcoded media data.

In this manner, UE 274 represents an example of a first user equipment (UE) for communicating media data including: a memory configured to store media data; and a processing system comprising one or more processors implemented in circuitry, the processing system being configured to: send a request to start an augmented reality (AR) media call with a second UE to a call session control function (CSCF), the request including data indicating a request for transcoding of AR media data to two-dimensional video data; establish a media communication session with a transcoding device executing a media function or a multimedia resource function, the transcoding device being between the first UE and the second UE; receive transcoded media data from the transcoding device that the transcoding device transcoded from AR media data received from the second UE; and present the transcoded media data.

Likewise, MF/MRF 262 represents an example of a transcoding device executing a media function or a multimedia resource function including: a memory configured to store media data; and a processing system comprising one or more processors implemented in circuitry, the processing system being configured to: receive a request from a first user equipment (UE) for transcoding of augmented reality (AR) media data of an AR call with a second UE; in response to receiving AR media data from the second UE, render the AR media data to form rendered 2D media data; and send the rendered 2D media data to the first UE.

Figure 6:
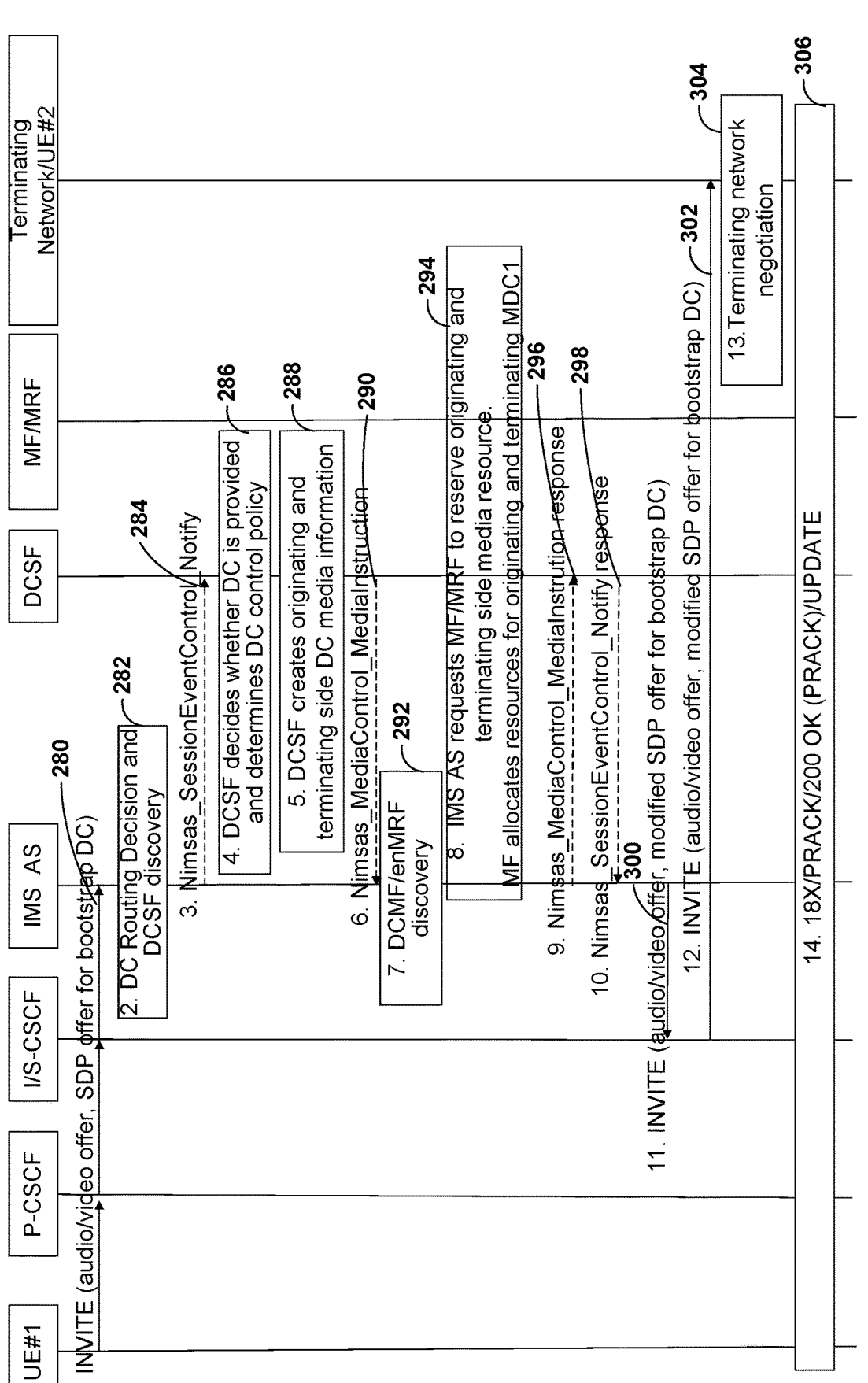
FIGS. 6 and 7 are flow diagrams illustrating an example AR call setup process that may be used by the architecture of FIG. 5.
Figure 7:
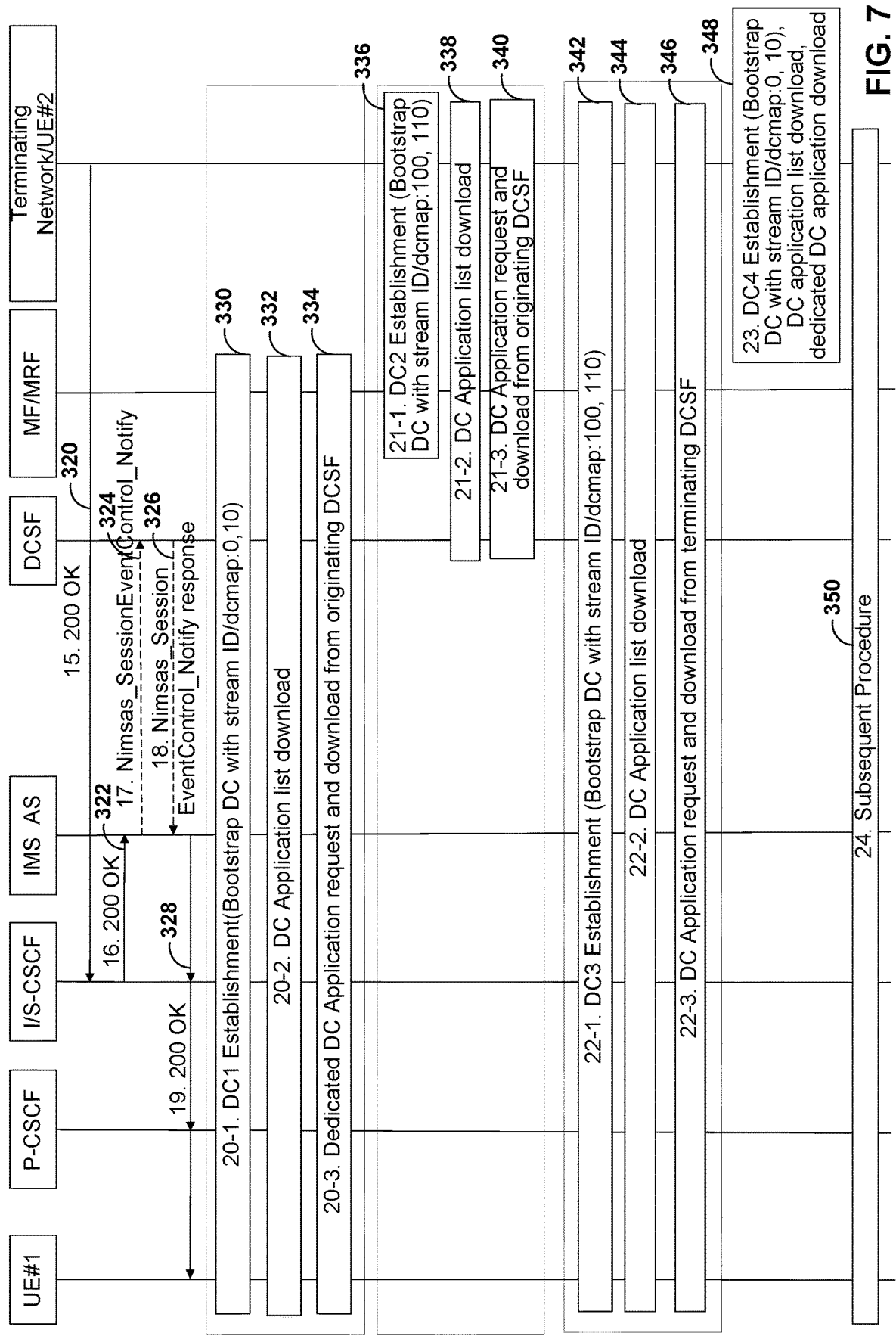

FIGS. 6 and 7 are flow diagrams illustrating an example AR call setup process that may be used by the architecture of FIG. 5. Initially, a UE (such as UE 274 of FIG. 5) sends an invite to an AR session to an IP Multimedia Subsystem (IMS) application server (AS), such as IMS AS 260 of FIG. 5 (280). The invite may include an audio/video offer, a session description protocol (SDP) offer for a bootstrap DC, or the like. The IMS AS may perform a DC routing decision and DCSF discovery (282). The IMS AS may then send a session event control notify message (e.g., Nimsas_SessionEventControl_Notify) to a DCSF, such as DSCF 256 of FIG. 5 (284).

The DCSF may then decide whether DC is provided and, if so, determine a DC control policy (286). The DCSF may also create originating and terminating side DC media information (288). The DCSF may then return a media control and media instruction request message (e.g., a Nimsas_MediaControl_Media_information) to the IMS AS (290).

The IMS AS may then perform DCMF/enMRF discovery (292). The IMS AS may request that an MF/MRF (such as MF/MRF 262 of FIG. 5) reserve originating and terminating media side media resources to cause the MF/MRF to allocate resources for originating and terminating MDC1 (294). The IMS AS may further send a media control media instruction response (e.g., Nimsas_MediaControl_MediaInstruction_response) to the DCSF (296). The DCSF may respond with a session event control notification response (e.g., a Nimsas_SessionEventControl_Notify response) (298).

The IMS AS may then send the invite message to an I/S-CSCF, such as I/S-CSCF 264 of FIG. 5 (300). The I/S-CSCF may then send the invite message to a second UE (not shown in FIG. 5), which may be communicatively coupled to the remote IMS of FIG. 5 (302). The remote IMS (also referred to as a "terminating network") and the second UE may perform terminating network negotiation to establish an AR session between the first UE (UE #1 in FIG. 6) and the second UE (304). This may result in exchange of 18X/PRACK/200 OK (PRACK)/Update message(s) (306).

Continuing to FIG. 7, the second UE may send a 200 OK message to the I/S-CSCF (320). The I/S-CSCF may send a 200 OK message to the IMS AS (322). The IMS AS may send a session event control notify message (e.g., Nimsas_SessionEventControl_Notify) to the DSCF (324). The DCSF may respond with a session event control notification response (e.g., Nimsas_SessionEventControl_Notify response) message to the IMS AS (326). The IMS AS may then send a 200 OK message to the first UE (328).

The first UE may perform DC1 establishment with the MF/MRF (e.g., bootstrap a DC with stream ID/dcmap: 0, 10) (330). The first UE may also download a DC application list (332). The first UE may send a dedicated DC application request and download from the originating DCSF (334).

The MF/MRF may perform DC2 establishment with the second UE (e.g., bootstrap a DC with stream ID/dcmap: 100, 110) (336). The second UE may download a DC application list (338) from the DCSF. The second UE may also send a dedicated DC application request and download from the originating DCSF (340).

The first UE and the second UE may then perform DC3 establishment, e.g., bootstrap a DC with stream ID/dcmap: 100/110) (342). The first UE and the second UE may download a DC application list (344). The first UE and the second UE may also perform a DC application request and download from the terminating DCSF (346). The second UE may then perform DC4 establishment (e.g., bootstrap DC with stream ID/dcmap: 0, 10), download a DC application list, and perform a dedicated DC application download (348). The first UE and second UE may then engage in the AR session as other subsequent procedures (350).

Figure 8:
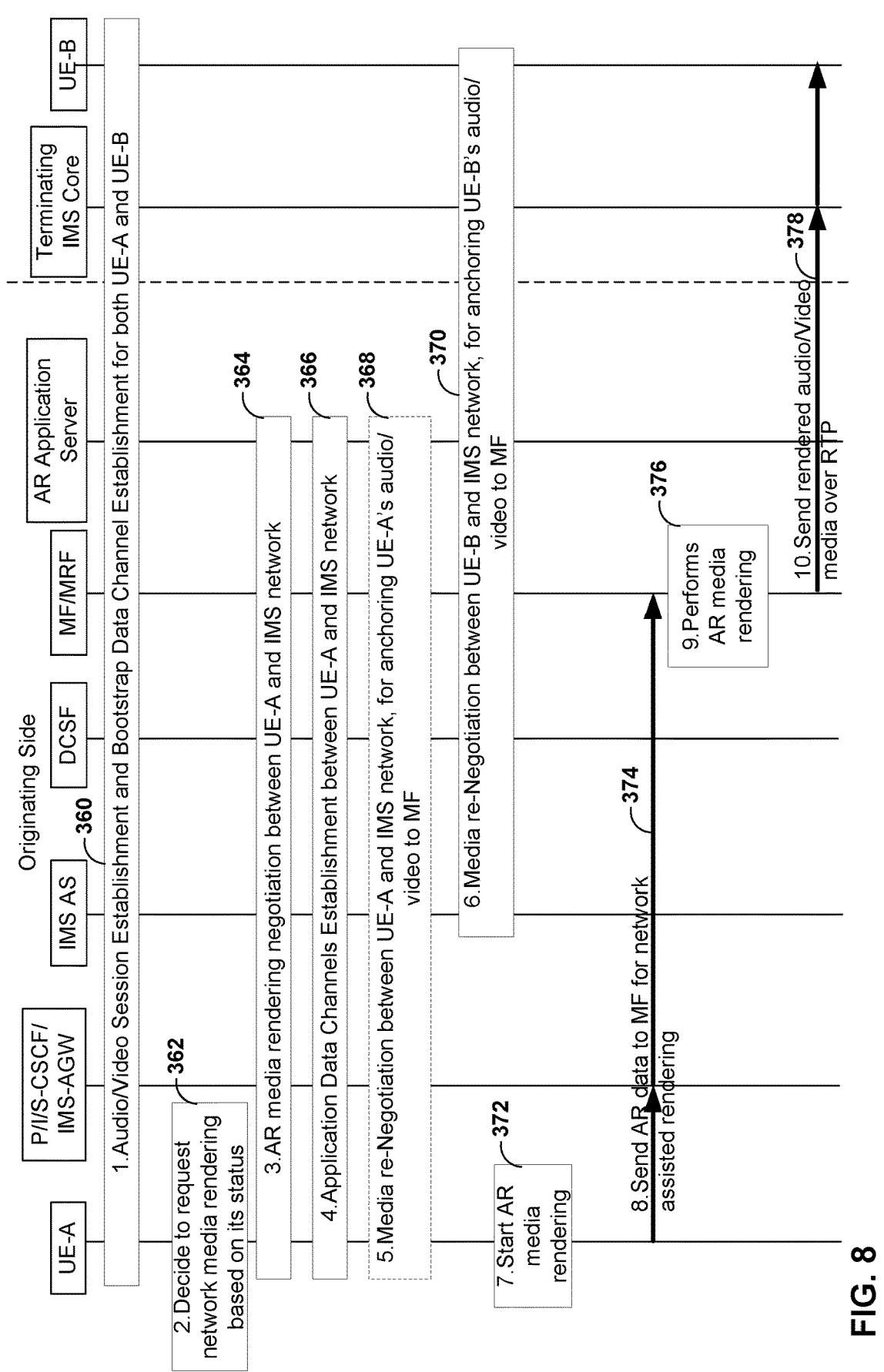
FIG. 8 is a flow diagram illustrating an example call setup procedure that may enable remote rendering of AR content based on a request from a sender of AR content.

FIG. 8 is a flow diagram illustrating an example call setup procedure that may enable remote rendering of AR content based on a request from a sender of AR content. Initially, two UEs (UE A and UE B in this example) perform an audio/video establishment procedure and bootstrap a data channel establishment for the first and second UEs (360). The first UE may then decide to request network media rendering based on its status (362). Per the techniques of this disclosure, the first UE may negotiate a request to perform AR media rendering with the IMS network (364). The first UE and the IMS network may establish application data channels (366). The first UE and the IMS network may further perform media renegotiation for anchoring the audio and/or video of the first UE to the MF/MRF (368).

The IMS network and the second UE may also perform media renegotiation to anchor the audio and/or video data of the second UE to the MF/MRF (370). The first UE may start AR media rendering (372). The first UE may send AR data to the MF/MRF for network assisted rendering (374). The MF/MRF may perform AR media rendering (376). The MF/MRF may then send the rendered AR media data (audio and/or video), e.g., over RTP to the second UE (378).

Figure 9:
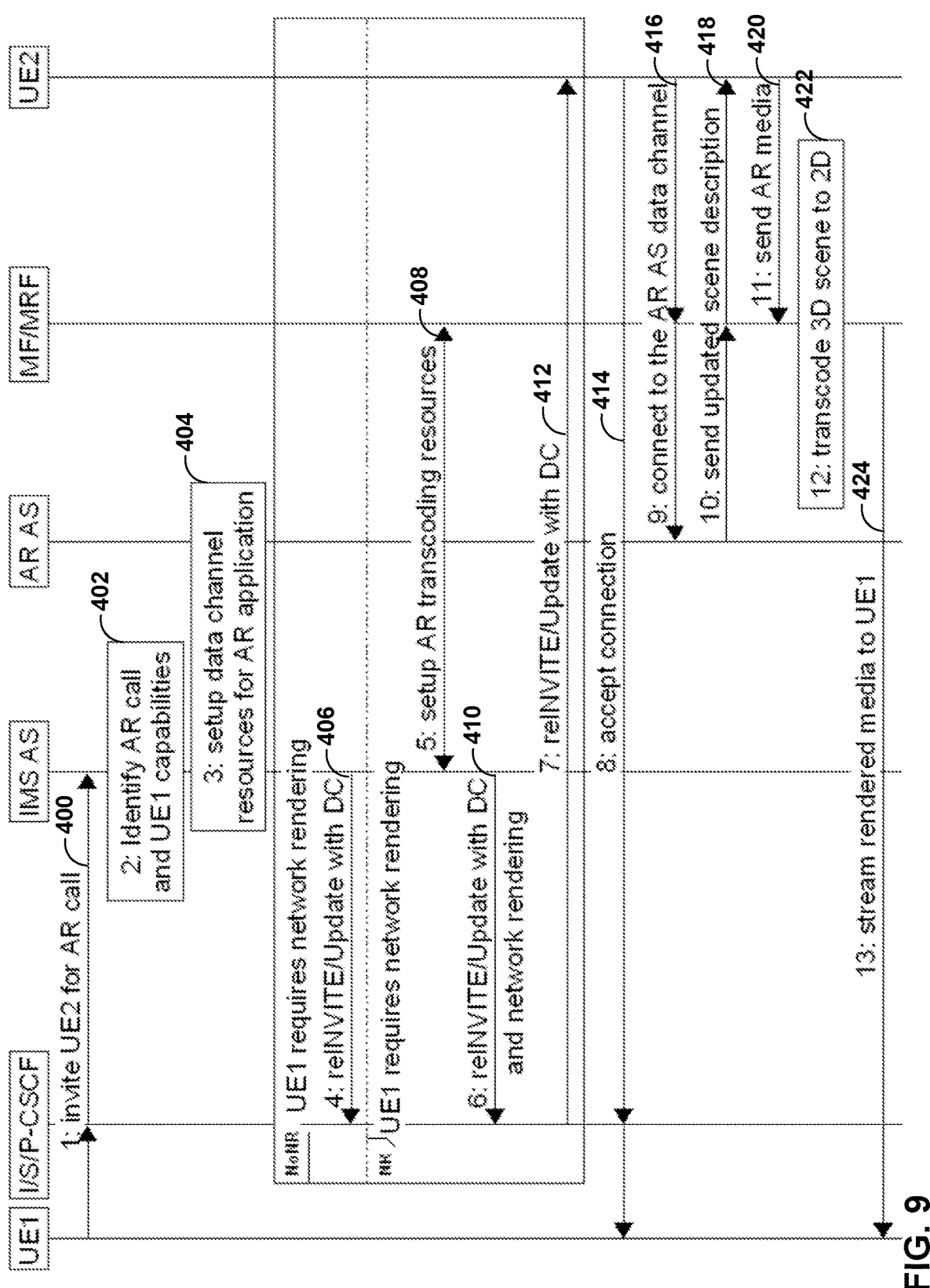
FIG. 9 is a call flow diagram illustrating an example process for setting up an AR call according to techniques of this disclosure.

FIG. 9 is a call flow diagram illustrating an example process for setting up an AR call according to techniques of this disclosure. In the example of FIG. 9, initially, UE 1 determines to start an AR call with UE2 or join an ongoing AR conference (400). UE1 generates an SDP offer that indicates that UE1 can only receive 2D content. The offer may indicate that UE1 can send pose information and other 2D/3D media. UE1 sends an invite to the I/S/P-CSCF, which forwards the invite to an IMS AS.

The IMS AS may then identify the capabilities of UE1 and determine to invoke network rendering functionality for the AR call (402). The IMS AS may further rewrite the SDP offer to redirect 3D media and scene content to the media function (MF).

The IMS AS may then negotiate the data channel resources for the session with the MF/MRF (404).

If no network rendering is needed, the IMS AS may forward the invitation to the I/S/P-CSCF, including the data channel information (406).

The IMS AS may allocate, via the data channel DCSF, the resources for transcoding of the 3D content (408).

The IMS AS may then forward the updated invite to the I/S/P-CSCF (410). This invitation may indicate that the 3D content should be routed to the MF.

The I/S/P-CSCF may then forward the invite that was generated in step 410 to UE2 (412).

UE2 may then send data to the IMS AS that UE2 has accepted the call invite (414).

The second UE may connect to the AR AS (416). The AR AS may send scene updates to UE2 and to the MF (418).

The second UE may then send AR media data to the MF/MRF (420).

The MF/MRF may transcode the AR media data from the second UE of the 3D scene by performing network rendering (422).

The MF/MRF may stream the rendered media resulting from the transcoding and network rendering to UE1 (424).

This procedure allows the network to invoke remote rendering for the AR call, without explicit intervention of the UE. The IMS AS, in this example, is responsible for selecting the appropriate network MF that will perform the network rendering operation for the session.

The AR AS, in this example, is the central entity for the AR call. In this example, the AR AS manages the scene description for the session and performs scene composition. The endpoints may send scene updates and pose information to the AR AS over the data channel.

UE1 may determine that UE1 is joining an AR call, or may not receive information indicating that UE1 is joining an AR call. If UE1 determines that an AR call is being joined, UE1 may share information about its display capabilities and its current viewer pose for XR remote rendering. To share this information with the IMS AS, UE1 may use SDP attributes according to the techniques of this disclosure. The IMS AS may detect the signaling from UE1 and use that information to configure the MF remote rendering session. The SDP attributes may include any or all of:

Display configuration, e.g., access to an HMD

OpenXR support: the supported view configuration and projection layers

GPU capabilities such as support for different rendering pipelines as well as the supported scene complexity An SDP session level attribute, per the techniques of this disclosure, may indicate these capabilities for the session setup phase. The ABNF syntax for the SDP session level attribute may be as follows:

```
display-attr="a=display-capabilities:" view-config
    SP*(projection-param/render-param)

view-config="view=" "2D"/"Stereo"/"Stereo+
    Depth"/"Stereo+Transparency"/"Stereo+Depth+
    Transparency"

projection-param="projection="1*(("Quad"/
    "Equirectangular"/"Depth")*1(";"))
```

The IMS AS may detect this attribute and determine to invoke remote rendering capabilities for the AR call. The absence of the attribute may indicate that the device has no AR capabilities. If the other participant is offering 3D content, the IMS AS may invoke network rendering capabilities to convert from 3D to 2D.

Figure 10:
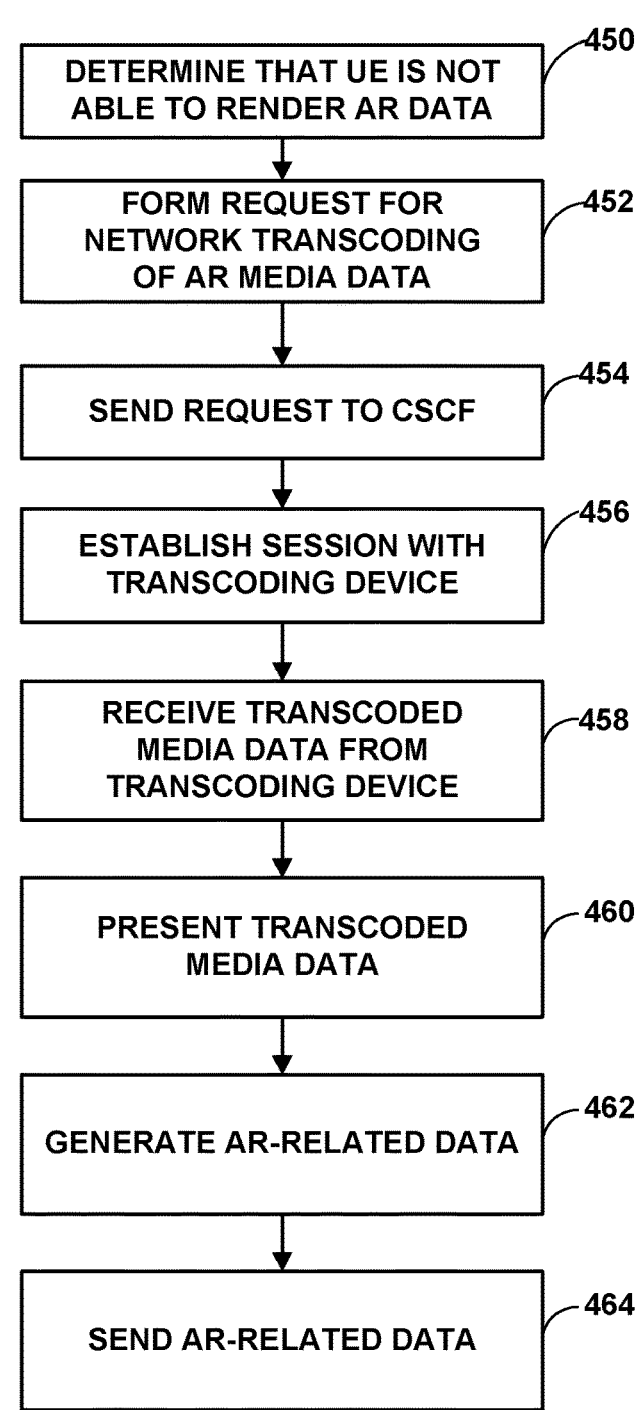
FIG. 10 is a flowchart illustrating an example method that may be performed by a client device, e.g., a user equipment (UE) device, to request transcoding of AR media data according to techniques of this disclosure.

FIG. 10 is a flowchart illustrating an example method that may be performed by a client device, e.g., a user equipment (UE) device, to request transcoding of AR media data according to techniques of this disclosure. Initially, a UE may determine that the UE is not able to render AR data (450). Assuming a user of the UE requests to participate in an AR media session with a second, different UE, the UE may form a request for network transcoding of AR media data (452). The request may be a request that AR media data be transcoded to two-dimensional video data. The UE may send the request to a CSCF (454). The CSCF may forward the request to a transcoding device. Thus, the UE may send the request to the CSCF to cause the CSCF to send the request to the transcoding device.

Ultimately, the UE may establish a session with the transcoding device (456). The UE may receive transcoded media data from the transcoding device (458). That is, second UE may send AR media data to the transcoding device, and the transcoding device may render and transcode the AR media data to 2D video data, then send the 2D video data (i.e., the transcoded media data) to the UE. The UE may then present the transcoded media data (460).

In some examples, despite not being capable of rendering AR media data (or not actually participating in the AR media data rendering process), the UE may nevertheless be capable of generating AR-related data, such as pose data. Pose data may represent, for example, a relative position of a user of the UE in a 3D virtual scene, as well as a direction/ orientation in which the user of the UE is looking. Thus, the UE may generate AR-related data, such as the pose data (462), e.g., based on sensor data that collects a location and orientation of the UE. The UE may then send the AR related data to the transcoding device (or to the second UE via the transcoding device).

In this manner, the method of FIG. 10 represents an example of a method of communicating media data, the method comprising: sending, by a first user equipment (UE), a request to start an augmented reality (AR) media call with a second UE to a call session control function (CSCF), the request including data indicating a request for transcoding of AR media data to two-dimensional video data; establishing, by the first UE, a media communication session with a transcoding device executing a media function or a multimedia resource function, the transcoding device being between the first UE and the second UE; receiving, by the first UE, transcoded media data from the transcoding device that the transcoding device transcoded from AR media data received from the second UE; and presenting, by the first UE, the transcoded media data.

Figure 11:
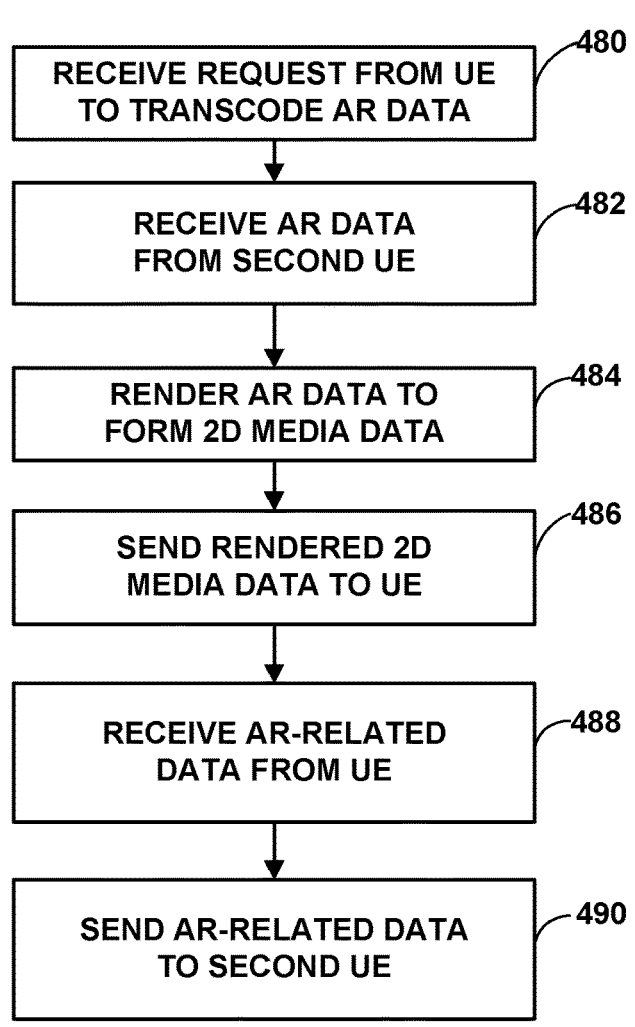
FIG. 11 is a flowchart illustrating an example method of transcoding AR media data according to techniques of this disclosure.

FIG. 11 is a flowchart illustrating an example method of transcoding AR media data according to techniques of this disclosure. The method of FIG. 11 may be performed by a transcoding device, such as a device that executes a media function (MF) and/or a multimedia rendering function (MRF). The transcoding device may correspond to, for example, AR AS 182 or MRF 186 of FIG. 3 or MF/MRF 262 of FIG. 5.

Initially, the transcoding device may receive a request from a first UE to transcode AR data for the first UE (480). The transcoding device may initiate transcoding resources based on configuration data received from an IP multimedia subsystem (IMS) application server (AS) to which the first UE is communicatively coupled. Thus, when the transcoding device receives AR data from a second UE (482) destined for the first UE, the transcoding device may render the AR data to form 2D media data (484). The AR data may be encoded using a first encoding scheme, such that the transcoding device may decode the AR data prior to rendering, then after rendering the AR data to form 2D video data, the transcoding device may encode the 2D video data, e.g., using ITU-T H.264/Advanced Video Coding (AVC), ITU-T H.265/High Efficiency Video Coding (HEVC), ITU-T H.266/Versatile Video Coding (VVC), or other such video coding standards (e.g., AV1). In this manner, the media data may be transcoded. The transcoding device may then send the rendered 2D media data to the first UE (486).

In some examples, the transcoding device may receive AR-related data from the first UE (488), such as pose data. In response, the transcoding device may send the AR-related data to the second UE (490).

In this manner, the method of FIG. 11 represents an example of a method of communicating media data, the method including: receiving, by a transcoding device executing a media function or a multimedia resource function, a request from a first user equipment (UE) for transcoding of augmented reality (AR) media data of an AR call with a second UE; in response to receiving, by the transcoding device, AR media data from the second UE, rendering, by the transcoding device, the AR media data to form rendered 2D media data; and sending, by the transcoding device, the rendered 2D media data to the first UE.

The clauses below represent various examples of the techniques of this disclosure:

Clause 1: A method of communicating media data, the method comprising: sending, by a first user equipment (UE), a request to start an augmented reality (AR) media communication session with a second UE, the request including data indicating that the first UE can provide AR-related data; establishing, by the first UE, a media communication session with an AR application server (AS), the AR AS being between the first UE and the second UE; and sending, by the first UE, the AR-related data to the second UE via the AR AS.

Clause 2: The method of clause 1, further comprising: receiving, by the first UE, AR media data from the AR AS and rendered by the AR AS, the AR media data including AR data corresponding to the second UE; and presenting, by the first UE, the AR media data.

Clause 3: A method of communicating media data, the method comprising: receiving, by a first user equipment (UE), an invitation to start an augmented reality (AR) media communication session from a second UE; establishing, by the first UE, a connection to an enhanced multimedia resource function (eMRF); receiving, by the first UE, a scene description from the eMRF via the connection to the eMRF; establishing, by the first UE, a connection to an AR application server (AR AS); and sending, by the first UE, AR-related data to the second UE via the AR AS.

Clause 4: The method of clause 1, further comprising: receiving, by the first UE, AR media data from the AR AS and rendered by the AR AS, the AR media data including AR data corresponding to the second UE; and presenting, by the first UE, the AR media data.

Clause 5: A method of communicating media data, the method comprising: receiving, by one or more processors, a request from a first user equipment (UE) to start an augmented reality (AR) media communication session with a second UE, the request including data indicating that the first UE can provide AR-related data; determining, by the one or more processors, that the first UE can receive two-dimensional (2D) video data and cannot receive three-dimensional (3D) video data; sending, by the one or more processors, an invitation to the AR media communication session to the second UE; establishing, by the one or more processors, a first media communication session with the first UE and a second media communication session with the second UE; in response to receiving, by the one or more processors, the AR-related data from the first UE, sending the AR-related data to the second UE; in response to receiving, by the one or more processors, AR media data from the second UE, rendering the AR media data to form rendered 2D media data and sending the rendered 2D media data to the first UE.

Clause 6: A method of communicating media data, the method comprising: receiving, by one or more processors, a request from a first user equipment (UE) to start an augmented reality (AR) media communication session with a second UE, the request including data indicating that the first UE can provide AR-related data; determining, by the one or more processors, that the first UE can receive two-dimensional (2D) video data and cannot receive three-dimensional (3D) video data; sending, by the one or more processors, an invitation to the AR media communication session to the second UE; establishing, by the one or more processors, a first media communication session with the first UE and a second media communication session with the second UE; in response to receiving AR media data from the second UE: rendering, by the one or more processors, the AR media data to form rendered 2D media data; and sending, by the one or more processors, the rendered 2D media data to the first UE.

Clause 7: A system for communication media data, the system comprising one or more means for performing the method of any of clauses 1-6.

Clause 8: The system of clause 7, wherein the one or more means comprise one or more processors implemented in circuitry and a memory configured to store AR media data.

Clause 9: A first user equipment (UE) device for communicating media data, the first UE device comprising: means for sending a request to start an augmented reality (AR) media communication session with a second UE, the request including data indicating that the first UE can provide AR-related data; means for establishing a media communication session with an AR application server (AS), the AR AS being between the first UE and the second UE; and means for sending the AR-related data to the second UE via the AR AS.

Clause 10: A first user equipment (UE) device for communicating media data, the first UE device comprising: means for receiving an invitation to start an augmented reality (AR) media communication session from a second UE; means for establishing a connection to an enhanced multimedia resource function (eMRF); means for receiving a scene description from the eMRF via the connection to the eMRF; means for establishing a connection to an AR application server (AR AS); and means for sending AR-related data to the second UE via the AR AS.

Clause 11: A method of communicating media data, the method comprising: sending, by a first user equipment (UE), a request to start an augmented reality (AR) media call with a second UE to a call session control function (CSCF), the request including data indicating a request for transcoding of AR media data to two-dimensional video data; establishing, by the first UE, a media communication session with a transcoding device executing a media function or a multimedia resource function, the transcoding device being between the first UE and the second UE; receiving, by the first UE, transcoded media data from the transcoding device that the transcoding device transcoded from AR media data received from the second UE; and presenting, by the first UE, the transcoded media data.

Clause 12: The method of clause 11, wherein sending the request further comprises indicating in the request that the first UE can provide AR-related data, the method further comprising sending, by the first UE, AR-related data to the second UE.

Clause 13: The method of clause 12, wherein the AR-related data includes pose information for the first UE.

Clause 14: The method of clause 11, wherein sending the request to start the AR media call comprises sending the request to start the AR media call to an IP Multimedia Subsystem (IMS) application server (AS) via the CSCF.

Clause 15: The method of clause 14, further comprising, in response to the CSCF receiving an updated invitation to the AR media call from the IMS AS and sending the updated invitation to the second UE, receiving an accept message to the AR media call from the second UE.

Clause 16: A first user equipment (UE) for communicating media data, the first UE comprising: a memory configured to store media data; and a processing system comprising one or more processors implemented in circuitry, the processing system being configured to: send a request to start an augmented reality (AR) media call with a second UE to a call session control function (CSCF), the request including data indicating a request for transcoding of AR media data to two-dimensional video data; establish a media communication session with a transcoding device executing a media function or a multimedia resource function, the transcoding device being between the first UE and the second UE; receive transcoded media data from the transcoding device that the transcoding device transcoded from AR media data received from the second UE; and present the transcoded media data.

Clause 17: The first UE of clause 16, wherein to send the request, the processing system is further configured to indicate in the request that the first UE can provide AR-related data, and wherein the processing system is further configured to send AR-related data to the second UE.

Clause 18: The first UE of clause 17, wherein the AR-related data includes pose information for the first UE.

Clause 19: The first UE of clause 16, wherein to send the request to start the AR media call, the processing system is configured to send the request to start the AR media call to an IP Multimedia Subsystem (IMS) application server (AS) via the CSCF.

Clause 20: The first UE of clause 19, wherein the processing system is further configured to, in response to the CSCF receiving an updated invitation to the AR media call from the IMS AS and sending the updated invitation to the second UE, receive an accept message to the AR media call from the second UE.

Clause 21: The first UE of clause 16, further comprising a display configured to display the transcoded media data.

Clause 22: The first UE of clause 16, wherein the first UE comprises one or more of a camera, a computer, a mobile device, a broadcast receiver device, or a set-top box.

Clause 23: A method of communicating media data, the method comprising: receiving, by a transcoding device executing a media function or a multimedia resource function, a request from a first user equipment (UE) for transcoding of augmented reality (AR) media data of an AR call with a second UE; in response to receiving, by the transcoding device, AR media data from the second UE, rendering, by the transcoding device, the AR media data to form rendered 2D media data; and sending, by the transcoding device, the rendered 2D media data to the first UE.

Clause 24: The method of clause 23, further comprising determining that the first UE can receive two-dimensional (2D) video data and that the first UE has requested transcoding of AR media data to the 2D video data.

Clause 25: The method of clause 23, wherein the request includes data indicating that the first UE can provide AR-related data.

Clause 26: The method of clause 25, further comprising, in response to receiving, by the transcoding device, the AR-related data from the first UE, sending the AR-related data to the second UE.

Clause 27: The method of clause 23, further comprising: sending, by the transcoding device, an invitation to the AR media call to the second UE; and establishing, by the transcoding device, a first media communication session with the first UE and a second media communication session with the second UE.

Clause 28: The method of clause 23, further comprising initiating AR transcoding resources based on configuration data received from an IP Multimedia Subsystem (IMS) application server (AS).

Clause 29: A transcoding device executing a media function or a multimedia resource function, the transcoding device comprising: a memory configured to store media data; and a processing system comprising one or more processors implemented in circuitry, the processing system being configured to: receive a request from a first user equipment (UE) for transcoding of augmented reality (AR) media data of an AR call with a second UE; in response to receiving AR media data from the second UE, render the AR media data to form rendered 2D media data; and send the rendered 2D media data to the first UE.

Clause 30: The transcoding device of clause 29, wherein the processing system is further configured to determine that the first UE can receive two-dimensional (2D) video data and that the first UE has requested transcoding of AR media data to the 2D video data.

Clause 31: The transcoding device of clause 29, wherein the request includes data indicating that the first UE can provide AR-related data.

Clause 32: The transcoding device of clause 31, wherein the processing system is further configured to, in response to receiving the AR-related data from the first UE, send the AR-related data to the second UE.

Clause 33: The transcoding device of clause 29, wherein the processing system is further configured to: send an invitation to the AR media call to the second UE; and establish a first media communication session with the first UE and a second media communication session with the second UE.

Clause 34: The transcoding device of clause 29, wherein the processing system is further configured to initiate AR transcoding resources based on configuration data received from an IP Multimedia Subsystem (IMS) application server (AS).

Clause 35: A method of communicating media data, the method comprising: sending, by a first user equipment (UE), a request to start an augmented reality (AR) media call with a second UE to a call session control function (CSCF), the request including data indicating a request for transcoding of AR media data to two-dimensional video data; establishing, by the first UE, a media communication session with a transcoding device executing a media function or a multimedia resource function, the transcoding device being between the first UE and the second UE; receiving, by the first UE, transcoded media data from the transcoding device that the transcoding device transcoded from AR media data received from the second UE; and presenting, by the first UE, the transcoded media data.

Clause 36: The method of clause 35, wherein sending the request further comprises indicating in the request that the first UE can provide AR-related data, the method further comprising sending, by the first UE, AR-related data to the second UE.

Clause 37: The method of clause 36, wherein the AR-related data includes pose information for the first UE.

Clause 38: The method of any of clauses 35-37, wherein sending the request to start the AR media call comprises sending the request to start the AR media call to an IP Multimedia Subsystem (IMS) application server (AS) via the CSCF.

Clause 39: The method of clause 38, further comprising, in response to the CSCF receiving an updated invitation to the AR media call from the IMS AS and sending the updated invitation to the second UE, receiving an accept message to the AR media call from the second UE.

Clause 40: A first user equipment (UE) for communicating media data, the first UE comprising: a memory configured to store media data; and a processing system comprising one or more processors implemented in circuitry, the processing system being configured to: send a request to start an augmented reality (AR) media call with a second UE to a call session control function (CSCF), the request including data indicating a request for transcoding of AR media data to two-dimensional video data; establish a media communication session with a transcoding device executing a media function or a multimedia resource function, the transcoding device being between the first UE and the second UE; receive transcoded media data from the transcoding device that the transcoding device transcoded from AR media data received from the second UE; and present the transcoded media data.

Clause 41: The first UE of clause 40, wherein to send the request, the processing system is further configured to indicate in the request that the first UE can provide AR-related data, and wherein the processing system is further configured to send AR-related data to the second UE.

Clause 42: The first UE of clause 41, wherein the AR-related data includes pose information for the first UE.

Clause 43: The first UE of any of clauses 40-42, wherein to send the request to start the AR media call, the processing system is configured to send the request to start the AR media call to an IP Multimedia Subsystem (IMS) application server (AS) via the CSCF.

Clause 44: The first UE of clause 43, wherein the processing system is further configured to, in response to the CSCF receiving an updated invitation to the AR media call from the IMS AS and sending the updated invitation to the second UE, receive an accept message to the AR media call from the second UE.

Clause 45: The first UE of any of clauses 40-44, further comprising a display configured to display the transcoded media data.

Clause 46: The first UE of any of clauses 40-45, wherein the first UE comprises one or more of a camera, a computer, a mobile device, a broadcast receiver device, or a set-top box.

Clause 47: A method of communicating media data, the method comprising: receiving, by a transcoding device executing a media function or a multimedia resource function, a request from a first user equipment (UE) for transcoding of augmented reality (AR) media data of an AR call with a second UE; in response to receiving, by the transcoding device, AR media data from the second UE, rendering, by the transcoding device, the AR media data to form rendered 2D media data; and sending, by the transcoding device, the rendered 2D media data to the first UE.

Clause 48: The method of clause 47, further comprising determining that the first UE can receive two-dimensional (2D) video data and that the first UE has requested transcoding of AR media data to the 2D video data.

Clause 49: The method of any of clauses 47 and 48, wherein the request includes data indicating that the first UE can provide AR-related data.

Clause 50: The method of clause 49, further comprising, in response to receiving, by the transcoding device, the AR-related data from the first UE, sending the AR-related data to the second UE.

Clause 51: The method of any of clauses 47-50, further comprising: sending, by the transcoding device, an invitation to the AR media call to the second UE; and establishing, by the transcoding device, a first media communication session with the first UE and a second media communication session with the second UE.

Clause 52: The method of any of clauses 47-51, further comprising initiating AR transcoding resources based on configuration data received from an IP Multimedia Subsystem (IMS) application server (AS).

Clause 53: A transcoding device executing a media function or a multimedia resource function, the transcoding device comprising: a memory configured to store media data; and a processing system comprising one or more processors implemented in circuitry, the processing system being configured to: receive a request from a first user equipment (UE) for transcoding of augmented reality (AR) media data of an AR call with a second UE; in response to receiving AR media data from the second UE, render the AR media data to form rendered 2D media data; and send the rendered 2D media data to the first UE.

Clause 54: The transcoding device of clause 53, wherein the processing system is further configured to determine that the first UE can receive two-dimensional (2D) video data and that the first UE has requested transcoding of AR media data to the 2D video data.

Clause 55: The transcoding device of any of clauses 53 and 54, wherein the request includes data indicating that the first UE can provide AR-related data.

Clause 56: The transcoding device of clause 55, wherein the processing system is further configured to, in response to receiving the AR-related data from the first UE, send the AR-related data to the second UE.

Clause 57: The transcoding device of any of clauses 53-56, wherein the processing system is further configured to: send an invitation to the AR media call to the second UE; and establish a first media communication session with the first UE and a second media communication session with the second UE.

Clause 58: The transcoding device of any of clauses 53-57, wherein the processing system is further configured to initiate AR transcoding resources based on configuration data received from an IP Multimedia Subsystem (IMS) application server (AS).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of communicating media data, the method comprising:
sending, by a first user equipment (UE), a request to start an augmented reality (AR) media call with a second UE to a call session control function (CSCF), the request including data indicating a request for transcoding of AR media data to two-dimensional video data;
establishing, by the first UE, a media communication session with a transcoding device executing a media function or a multimedia resource function, the transcoding device being between the first UE and the second UE, and the transcoding device being separate from the first UE and the second UE;
receiving, by the first UE, transcoded media data from the transcoding device that the transcoding device transcoded from AR media data received from the second UE; and
presenting, by the first UE, the transcoded media data.

2. The method of claim 1, wherein sending the request further comprises indicating in the request that the first UE can provide AR-related data, the method further comprising sending, by the first UE, AR-related data to the second UE.

3. The method of claim 2, wherein the AR-related data includes pose information for the first UE.

4. The method of claim 1, wherein sending the request to start the AR media call comprises sending the request to start the AR media call to an IP Multimedia Subsystem (IMS) application server (AS) via the CSCF.

5. The method of claim 4, further comprising, in response to the CSCF receiving an updated invitation to the AR media call from the IMS AS and sending the updated invitation to the second UE, receiving an accept message to the AR media call from the second UE.

6. A first user equipment (UE) for communicating media data, the first UE comprising:

a memory configured to store media data; and a processing system comprising one or more processors implemented in circuitry, the processing system being configured to:

send a request to start an augmented reality (AR) media call with a second UE to a call session control function (CSCF), the request including data indicating a request for transcoding of AR media data to two-dimensional video data;

establish a media communication session with a transcoding device executing a media function or a multimedia resource function, the transcoding device being between the first UE and the second UE, and the transcoding device being separate from the first UE and the second UE;

receive transcoded media data from the transcoding device that the transcoding device transcoded from AR media data received from the second UE; and present the transcoded media data.

7. The first UE of claim 6, wherein to send the request, the processing system is further configured to indicate in the request that the first UE can provide AR-related data, and wherein the processing system is further configured to send AR-related data to the second UE.

8. The first UE of claim 7, wherein the AR-related data includes pose information for the first UE.

9. The first UE of claim 6, wherein to send the request to start the AR media call, the processing system is configured to send the request to start the AR media call to an IP Multimedia Subsystem (IMS) application server (AS) via the CSCF.

10. The first UE of claim 9, wherein the processing system is further configured to, in response to the CSCF receiving an updated invitation to the AR media call from the IMS AS and sending the updated invitation to the second UE, receive an accept message to the AR media call from the second UE.

11. The first UE of claim 6, further comprising a display configured to display the transcoded media data.

12. The first UE of claim 6, wherein the first UE comprises one or more of a camera, a computer, a mobile device, a broadcast receiver device, or a set-top box.

13. A method of communicating media data, the method comprising:

receiving, by a transcoding device executing a media function or a multimedia resource function, a request from a first user equipment (UE) for transcoding of augmented reality (AR) media data of an AR call with a second UE, the transcoding device being between the first UE and the second UE and separate from the first UE and the second UE;

in response to receiving, by the transcoding device, AR media data from the second UE, rendering, by the transcoding device, the AR media data to form rendered 2D media data; and sending, by the transcoding device, the rendered 2D media data to the first UE.

14. The method of claim 13, further comprising determining that the first UE can receive two-dimensional (2D)

video data and that the first UE has requested transcoding of AR media data to the 2D video data.

15. The method of claim 13, wherein the request includes data indicating that the first UE can provide AR-related data.

16. The method of claim 15, further comprising, in response to receiving, by the transcoding device, the AR-related data from the first UE, sending the AR-related data to the second UE.

17. The method of claim 13, further comprising:

sending, by the transcoding device, an invitation to the AR media call to the second UE; and establishing, by the transcoding device, a first media communication session with the first UE and a second media communication session with the second UE.

18. The method of claim 13, further comprising initiating AR transcoding resources based on configuration data received from an IP Multimedia Subsystem (IMS) application server (AS).

19. A transcoding device executing a media function or a multimedia resource function, the transcoding device comprising:

a memory configured to store media data; and a processing system comprising one or more processors implemented in circuitry, the processing system being configured to:

receive a request from a first user equipment (UE) for transcoding of augmented reality (AR) media data of an AR call with a second UE, the transcoding device being between the first UE and the second UE and separate from the first UE and the second UE;

in response to receiving AR media data from the second UE, render the AR media data to form rendered 2D media data; and send the rendered 2D media data to the first UE.

20. The transcoding device of claim 19, wherein the processing system is further configured to determine that the first UE can receive two-dimensional (2D) video data and that the first UE has requested transcoding of AR media data to the 2D video data.

21. The transcoding device of claim 19, wherein the request includes data indicating that the first UE can provide AR-related data.

22. The transcoding device of claim 21, wherein the processing system is further configured to, in response to receiving the AR-related data from the first UE, send the AR-related data to the second UE.

23. The transcoding device of claim 19, wherein the processing system is further configured to:

send an invitation to the AR media call to the second UE; and establish a first media communication session with the first UE and a second media communication session with the second UE.

24. The transcoding device of claim 19, wherein the processing system is further configured to initiate AR transcoding resources based on configuration data received from an IP Multimedia Subsystem (IMS) application server (AS).

* * * * *